United States Patent [19]

Hill

[11] 4,130,618

[45] Dec. 19, 1978

[54] ETHYLENE POLYMER-PETROLEUM WAX COMPOSITIONS

[75] Inventor: Donald R. J. Hill, Houston, Tex.

[73] Assignee: Gulf Oil Corporation, Pittsburgh, Pa.

[21] Appl. No.: 856,475

[22] Filed: Dec. 1, 1977

[51] Int. Cl.$^2$ ............................................. B29G 7/00
[52] U.S. Cl. .............................. 264/123; 260/28.5 A;
264/126; 264/289; 264/331
[58] Field of Search ................... 260/28.5 A; 264/331,
264/289, 123, 126

[56] References Cited

U.S. PATENT DOCUMENTS

| | | | |
|---|---|---|---|
| 3,219,728 | 11/1965 | Joris et al. | 260/28.5 A |
| 3,227,669 | 1/1966 | Sauer | 260/28.5 A |
| 3,349,052 | 10/1967 | Zaayenga | 260/28.5 A |
| 3,383,445 | 5/1968 | Gebler et al. | 264/289 |
| 3,660,336 | 5/1972 | Gonta et al. | 260/28.5 A |

*Primary Examiner*—Melvyn I. Marquis
*Attorney, Agent, or Firm*—Richard L. Kelly

[57] ABSTRACT

Novel polymer compositions which can be extruded to prepare films of good quality are obtained when 20 to 150 parts by weight of a petroleum wax are blended with 100 parts by weight of an ethylene polymer having an annealed density of at least 0.95 and an intrinsic viscosity of at least about 3.0.

15 Claims, 1 Drawing Figure

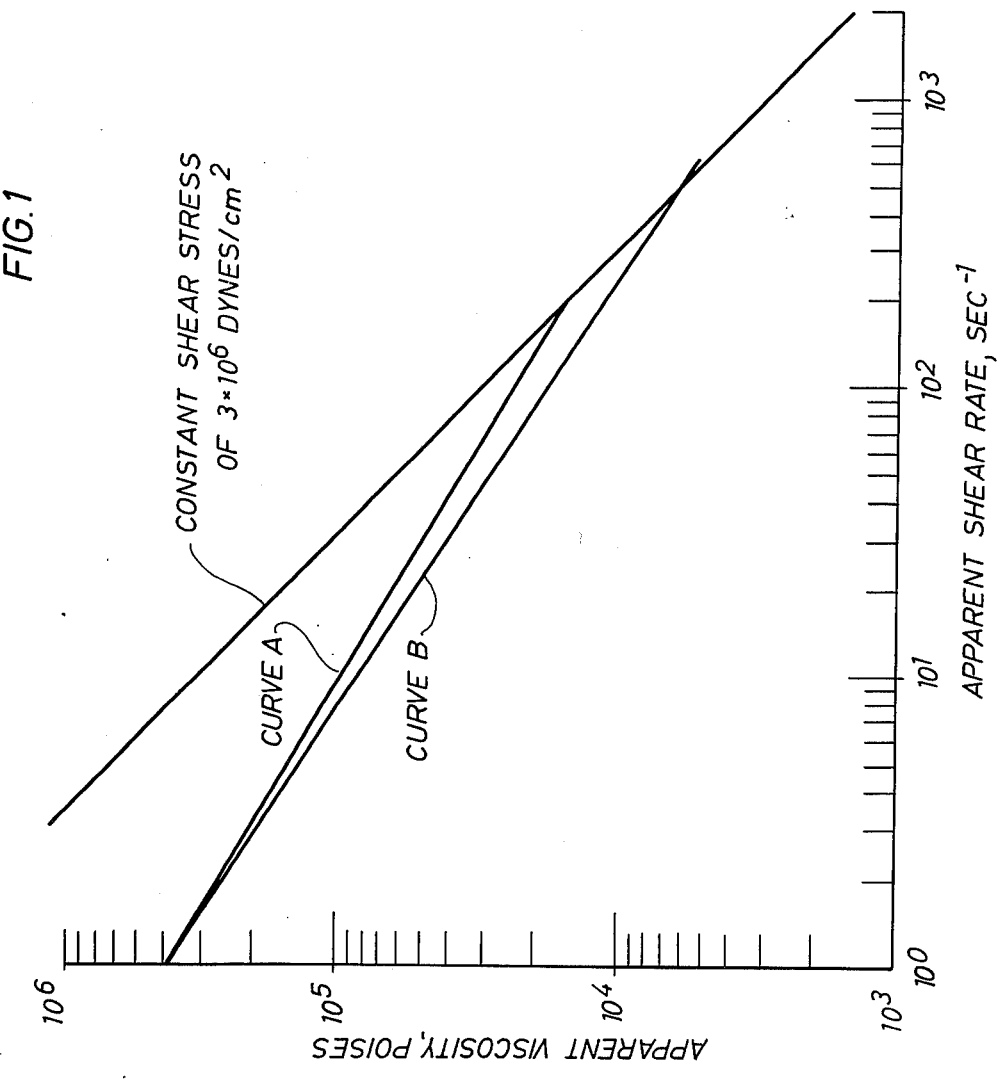

ETHYLENE POLYMER-PETROLEUM WAX COMPOSITIONS

BACKGROUND OF THE INVENTION

The so-called high density ethylene polymers having annealed densities of at least 0.95 are customarily prepared by polymerizing ethylene in the presence of solid catalysts of the so-called Ziegler-type, which are reaction products of a salt of a transition metal and a metal alkyl, typically an aluminum alkyl. Many of the newer Ziegler-type catalysts product ethylene polymers of unusually high molecular weight in that they have intrinsic viscosities of at least 3. Because of their high molecular weight and concomitantly high melt viscosities, such ethylene polymers are difficult to fabricate by many common plastic fabricating techniques such as extrusion. It would be desirable to have available to the art techniques for modifying the processing characteristics of such high molecular weight ethylene polymers.

SUMMARY OF THE INVENTION

Ethylene polymer compositions that can be fabricated readily by extrusion processes are prepared by intimately blending 20–150 parts* by weight of a petroleum wax with 100 parts by weight of a high density ethylene polymer having a very high molecular weight. These compositions, when extruded at 190° C. at an apparent shear rate of 400 sec.$^{-1}$ have an apparent melt viscosity of less than about 10,000 poises.

*Throughout the balance of this application, references to parts and percentage will be on a weight basis unless otherwise noted.

BRIEF DESCRIPTION OF THE DRAWING

The single drawing illustrates the melt flow properties of a composition of the invention and the ethylene polymer contained therein.

DETAILED DESCRIPTION OF THE INVENTION

The ethylene polymers employed in the compositions of the invention are highly crystalline polymers that have an annealed density of at least 0.95 (as determined by ASTM Method D 1505–63T). In addition, the ethylene polymers have very high molecular weights such that they have an intrinsic viscosity of at least 3 and frequently 8 or more. Frequently polymers having these intrinsic viscosities are referred to as ultra high molecular weight ethylene polymers. While intrinsic viscosity is independent of the solvent in which the viscosity is measured, all intrinsic viscosities reported in this application were determined in Decalin at a temperature of 135° C. employing approximately 0.05 gram of polymer dissolved in 100 ml of decalin with the measured value then being extrapolated to a zero polymer concentration.

The ethylene polymers with be either ethylene homopolymers, or ethylene copolymers having a small percentage of a $C_3$ or higher olefin monomer copolymerized therein. The comonomer, e.g., propylene, butene-1, hexene-1, or the like, functions to lower the annealed density of the ethylene polymer.

The ethylene polymers can be prepared by techniques known in the art. To obtain suitably high molecular weights, the catalysts employed should be those known to provide higher than normal molecular weight polymers. Many of these catalysts are magnesium modified Ziegler-type catalysts of the type disclosed in the following patents: U.S. Pat. No. 4,021,599, Japanese Published Application 47/18846, U.S. Pat. No. 3,642,746, German Pat. No. 2,346,471. Particularly suitable catalysts are those disclosed in the assignee's pending application Ser. No. 692,244, filed on June 3, 1976, now abandoned which disclosure is incorporated herein by reference.

The ethylene polymers customarily are prepared by contacting the ethylene with the polymerization catalyst in the presence of a suitable liquid hydrocarbon. If the polymerization is run at a sufficiently high temperature, the ethylene polymer will dissolve in the hydrocarbon solution. This process is frequently referred to as a solution process. If the polymerization is run at lower temperature and in the presence of low boiling solvents such as isobutane, the ethylene polymer is recovered as a suspension of finely-divided polymer in the hydrocarbon. This process is frequently referred to as a particle form process. The recovered polymer, after removal of the hydrocarbon, is a highly porous material having a low bulk density which, depending upon its particular process of manufacture, may be less than 20 lbs/ft$^3$. For the purpose of the present application, this porous low bulk density polymer will be referred to as "particle from ethylene polymer."

The petroleum wax employed in the invention can be any one of the three principal categories of the petroleum waxes, more specifically a paraffin wax, an intermediate wax, or a microcrystalline wax. As is recognized in the art, paraffin waxes are predominately normal paraffins, straight chain saturated hydrocarbons which may contain minor amounts of isoparaffins. The microcrystalline waxes are predominately cyclic saturated hydrocarbons (naphthenes) and isoparaffins. The intermediate waxes are blends or mixtures of paraffin and microcrystalline waxes. The paraffin waxes are preferred for use in the present invention.

Table I which follows sets forth certain of the physical and chemical properties of these three classes of waxes.

TABLE I

|  | Paraffin | Intermediate | Microcrystalline |
|---|---|---|---|
| Melting Point Range, ASTM D127° F | 120–160 | 130–160 | 130–180 |
| Molecular Weight Range | 340–400 | 360–550 | 500–600 |
| Density Range Gravity ASTM D287 ° API, 210° F. | 0.80–0.917 | 0.85–0.93 | 0.89–0.94 |
|  | 35–60 | 30–55 | 30–50 |
| Distillation, Vaccum Corrected to 760 mm Hg 5% point, ° F | 750–810 | 825–900 | 950–1,050 |

A typical paraffin wax has the following properties:

| | |
|---|---|
| Gravity ASTM D287 ° API | 41.3 |
| Melting point ASTM D87 ° F | 140.1 |
| Congealing point ASTM D938 ° F | 138.0 |
| Penetration ASTM D1321 at 77° F | 14.0 |
| at 100° F | 40.0 |
| Flash point, ° F | 455.0 |
| Ultraviolet absorbitivity at 280 mµ ASTM D2008 | 0.01 |
| Iodine number | 0.4 |
| Molecular weight | 442.0 |
| Refractive index | 1.4359 |
| Distillation vacuum corrected to 760 mm. Hg 5% point, ° F | 804.0 |

The compositions of the invention will be blended in proportions to provide about 20 to 150 parts, and preferably about 80 to 120 parts, of the petroleum wax for each 100 parts of ethylene polymer. In the special case of thermohardening ethylene polymer compositions to be subsequently discussed, a minimum of about 40 parts of petroleum wax is required for each 100 parts of ethylene polymer.

The ethylene polymer and the petroleum wax can be intimately blended together by any of the conventional techniques employed to disperse additives into ethylene polymers. The finely-divided ethylene polymer can be added with stirring to melted petroleum wax. Alternatively, melted petroleum wax can be sprayed onto a particle form ethylene polymer in a suitable mixer. By reason of the polymer's low bulk density and porosity, the melted wax is adsorbed by the polymer particles and the final product is recovered in the form of a free flowing powder. In a different procedure, a powdered mixture of the petroleum wax and a particle form ethylene polymer can be passed through a disc mill of the type disclosed in U.S. Pat. No. 3,584,799. In passing through the mill, the petroleum wax is melted and is adsorbed by the ethylene polymer particles. If the final product is desired in a densified form, a petroleum wax-ethylene polymer blend as prepared above can be processed in a Farrel CFM or a compounding extruder.

Particle form ethylene polymer having the petroleum wax adsorbed thereon is useful as a thermohardening composition. Such compositions can be converted into cast articles without use of pressure. The powdered composition is simply placed in a mold and heated to a temperature sufficiently high to melt the powdery composition. Temperatures as low as 130° C. are sufficient. Surprisingly, the melted compositions have low viscosities and readily fill the contours of the mold. Upon cooling, however, the cast article becomes hard and has properties similar to those of an article made by injection molding the ethylene polymer contained in the composition. While not wishing to be bound by any theory, it is believed that the petroleum wax first melts and then at least partially dissolves the ethylene polymer particles. The polymer chains then relax and ultimately become entangled with other polymer chains. Gelation then takes place.

Such thermohardening compositions have utility for the manufacture of small lot casting of phototype designs in inexpensive wood or plaster molds. The compositions also can be used as heat curing adhesives. The compositions burn without smoking and can be employed to manufacture very hard candles. The ethylene polymer employed in these thermohardening compositions does not require the high intrinsic viscosity values set forth earlier herein, as any type of particle form ethylene polymer can be employed for this purpose.

The petroleum wax-ethylene polymer compositions of the invention have desirable melt flow properties. The ethylene polymer components of the compositions, by reason of their very high molecular weights, have very high melt viscosities and are very difficult to fabricate by conventional techniques such as extrusion and injection molding. The compositions of the invention, however, have significantly lower melt viscosities and flow readily under modest pressures so that they can be fabricated easily by extrusion and injection molding techniques.

A common method for expressing the melt viscosity of a thermoplastic polymer composition is by reference to its melt index as determined by ASTM 1238-70. Condition E is employed in measuring the melt index of polymers having melt viscosity properties of the order of those conventionally obtained with low density polyethylenes. This value is the customarily reported melt index. For polymers having higher melt viscosities, Condition F is employed. This value is reported as the high load melt index. When 50 parts by weight of a paraffin wax having a melting point of about 45° C. is blended with 50 parts by weight of an ethylene polymer having a melt index of 0.005 (Condition E), the resulting composition has a melt index of about 0.2 (determined by Condition E).

The compositions of the invention exhibit a significantly greater shear thinning or pseudoplastic flow than do the ethylene polymers contained therein. Shear thinning is conveniently measured by the slope of the curve obtained by plotting, on a log-log scale, the apparent viscosity of the polymer against the apparent shear rate as the polymer is extruded. Such curves are essentially straight lines and the shear thinning of the polymer is proportional to the negative slope of the curve. Such curves are customarily prepared from melt flow data obtained at 190° C. with the slope of the curve being measured at an apparent shear rate of 10 sec.$^{-1}$. For a more detailed explanation as to the methods for preparing and interpreting such curves, see published German application No. 26 40 100.

FIG. 1 illustrates the typical shear thinning of a composition of the invention as compared with the shear thinning of the ethylene polymer contained therein. Curve A is the curve for the ethylene polymer and curve B is the curve for the petroleum wax-ethylene polymer composition of the invention. The third line is a constant shear stress line for a shear stress of $3 \times 10^6$ dynes/cm$^2$. It will be noted that curve B has a significantly greater negative slope than curve A. The compositions of the invention will shear thin to the extent that they will have an apparent viscosity of less than 10,000 poises when extruded at 190° C. at an apparent shear rate of 400 sec.$^{-1}$.

The large shear thinning of the compositions of the invention is important in that the compositions can be extruded with relatively low power consumption. To illustrate this effect, a commercially available high density ethylene polymer having a melt index of 0.3 (determined by Condition E) was blow extruded into film employing a barrel temperature of 205° C. and a die temperature of 177° C. A pressure of 3,000 psi developed within the die. A composition consisting of 50 parts of Ethylene Polymer A (subsequently described) and 50 parts of a paraffin wax having a melting point of about 45° C. was extruded in this same equipment under identical conditions. Although this composition has a melt index of only 0.2 (determined by Condition E), the pressure developed within the die was only 1850 psi by reason of the large shear thinning effect.

The compositions of the invention, despite their high petroleum wax content, have remarkably good physical properties. Typically a composition containing 50 weight % ethylene polymer and 50 weight % petroleum wax will have a tensile at yield of about 1,900 psi, a tensile at break of about 2,500 psi, and an elongation at break somewhat in excess of 1,200%.

The compositions of the invention can be fabricated into a wide variety of useful articles such as bottles, toys, cable jacketing, and the like. They generally perform in a manner essentially equivalent to low density ethylene polymers. Films and tapes prepared from the compositions of the invention have interesting properties which can be modified significantly by the processing conditions employed in their preparation. Film prepared from the compositions of the invention without significant orientation resembles film of low density polyethylene in its properties. In some cases, minor quantities of the petroleum wax bloom to the surface. The physical structure of film that has been oriented by stretching is quite different. As the film is stretched, it becomes highly transparent, which suggests the possibility that a different crystal structure is formed. It is further noted that in such oriented film, the petroleum wax will not bloom to the surface. This uniaxially oriented film can be readily fibrillated to form fibers. Biaxially oriented films has a good balance of physical properties in both the machine direction and the transverse direction.

The compositions of the invention can accept high loadings of inorganic pigments without significant adverse effect on the compositions' stress-strain properties. Suitable pigments include calcium carbonate, precipitated silicas, titanium dioxide, carbon black, talc, pigment grade clays, mica, and the like. Such pigments may be employed in quantities constituting 5–50 and preferably 15–40 weight % of the total composition. The inorganic pigments increase the stiffness modulus of the compositions. As a consequence, 1–3 mil film of such compositions can be used as a replacement for Kraft paper in the manufacture of grocery sacks.

The following examples are set forth to illustrate the principle and practice of the invention to those skilled in the art. Where parts and percentages are set forth, they are parts and percentages by weight.

ETHYLENE POLYMER A

A particle form ethylene polymer having a bulk density of about 15 lbs/ft$^3$, an intrinsic viscosity of about 8 and an annealed density of about 0.96 gms/ml was prepared by a continuous particle form polymerization process in a pipe loop reactor. Isobutane was employed as the reaction medium, with the polymerization temperature being maintained at about 105° C. with the reactor pressure being maintained at about 550 psig. Ethylene and isobutane were continuously charged to the reactor at the rate that isobutane and ethylene were being withdrawn from the reactor. Catalyst slurry was added in small increments as required to maintain the polymerization temperature.

The catalyst employed was a magnesium modified Ziegler-type catalyst prepared by the procedure described in the assignee's copending application Ser. No. 692,244, filed on June 3, 1976. Specifically, a 4-liter reaction vessel fitted with a stirrer, a reflux condenser, a dropping funnel, and heating and cooling means, was charged with a methanolic solutions of magnesium chloride prepared by dissolving 75 grams of magnesium chloride in 1 liter of methanol. Six hundred seventy grams of a finely divided powder of high density polyethylene having an average particle diameter of less than 40 microns was slurried in the methanolic solution of magnesium chloride. The slurry was heated to a temperature of 55° C. over a period of 30 minutes and stirring at this temperature was continued for another 30 minutes. The pressure then was reduced to about 10 mm of Hg to remove methanol from the system. Heating was continued for 2 hours under these conditions to assure removal of all methanol which did not form a complex with the magnesium chloride deposited on the polyethylene support. The powder was removed from the reaction vessel and ground to pass through a 40-mesh U.S. screen.

The magnesium chloride treated polyethylene powder prepared as described above in the amount of 200 grams, 300 ml of heptane, and 36 grams of diethyl aluminum chloride (charged as a 25% solution in heptane), was charged to a 4-liter reactor equipped as described above. This reaction mixture was stirred for 1 hour while maintaining the temperature at 25° C. Evolution of a gas was noted. At this point in the reaction, it is believed that the charged diethyl aluminum chloride has been chemically bonded to the polymeric support or one of the chemicals carried thereon. The reaction mixture then was heated to 80° C. and 345 grams of TiCl$_4$ were added to the reaction mixture from a dropping funnel over a period of one hour. The reaction mixture then was stirred for an additional 16–20 hours, while maintaining the temperature at 80° C. to assure complete reaction between the TiCl$_4$ and the components carried on the support. Prior to the addition of the TiCl$_4$, the solids present in the slurry were light yellow in color, but the color changed to a purple-red shortly after the addition of the TiCl$_4$. The liquid present in the slurry was removed by decantation, and the solids were washed with several aliquots of heptane until the heptane gave no test for the presence of chlorides. The solids then were recovered and dried under vacuum at ambient temperature.

The catalyst slurry was prepared by slurrying 1 part of the solids described above in 100 parts of heptane and adding thereto 4 parts of a 25% solution of triethyl aluminum in heptane.

ETHYLENE POLYMER B

A particle form ethylene polymer having a bulk density of about 18 lbs/ft$^3$, an intrinsic viscosity of about 6 and an annealed density of about 0.96 was prepared by a continuous particle form polymerization process carried out in a pipe loop reactor. The catlyst employed was the same as employed in the preparation of Ethylene Polymer A. Minor changes in the operation of the reactor provided a somewhat different bulk density and intrinsic viscosity.

EXAMPLE I

Part A

A thermohardening composition was prepared from 50 parts of Ethylene Polymer A and 50 parts of a petroleum wax having a melting point of about 45° C. The paraffin was placed in a beaker and melted. The ethylene polymer was added in small increments with stirring. The ethylene polymer particles absorbed the melted wax and remained a free flowing powder.

Part B

The powdered composition of Part A was tightly packed into plaster mold. The mold was maintained in a 135° C. oven for 1 hour. Upon cooling to room temperature, the mold was broken and a strong rigid casting was recovered which accurately reflected the detailed structure of the mold.

EXAMPLE II

A thermohardening composition was prepared from 50 parts of Ethylene Polymer B and 50 parts of a paraffin wax melting at about 45° C. The paraffin wax cut into small chips and blended with the ethylene polymer. The mixture was stirred for 2 minutes in a Waring Blender. A free flowing powder indistinguishable in apperrance from the product of Example I, Part A, was obtained. The paraffin wax had melted and was adsorbed on the polymer. The composition was placed in an open plaster mold and heated for about 10 minutes in an oven at 190° C. The recovered molded article had reproduced the detailed structure of the mold.

EXAMPLE III

The composition of Example I, Part A, was molded to determine stress-strain properties by ASTM methods. The tensile at yield was 1880 psi, the tensile at break was 2470 psi, and the elongation at break was 1270%.

EXAMPLE IV

Part A

A blown film having relatively little orientation was prepared from the composition of Example I, Part A. The film has the appearance and feel of film prepared from a low density ethylene polymer prepared by an autoclave process. Upon standing overnight, a small quantity of paraffin wax bloomed to the film's surface.

Part B

A second lot of film was prepared from the composition of Example I, Part A. The processing conditions were modified so that the film was highly biaxially oriented. The film was highly transparent and much stiffer than the film of Part A above. No paraffin wax bloomed to the surface even after standing for several days at room temperature.

EXAMPLE V

Candles were prepared from the composition of Example II. The candles burned without smoking and did not drip.

EXAMPLE VI

An extrudable composition was prepared by blending 100 parts of the composition of Example I, Part A, with 50 parts of pigment grade calcium carbonate. Blown film prepared from the composition resembled tissue paper in appearance and could be written on with a ball point pen. The film was stiffer than the film prepared in Example IV, Part A. No paraffin wax bloomed to the film surface even after standing for several days at room temperature.

EXAMPLE VII

The composition of Example II was extruded to prepare a uniaxially oriented film. The film was highly transparent and no paraffin wax bloomed to the surface even after standing for several days at room temperature. The film can be easily fibrillated using conventional fibrillation equipment.

What is claimed is:

1. A process for the manufacture of a finely-divided, particulate, free-flowing thermohardening ethylene polymer composition which consists essentially of intimate mixing 40 to 150 parts by weight of melted petroleum wax with 100 parts by weight of a finely-divided particle form ethylene polymer having a bulk density of less than about 20 lbs/ft.$^3$, an annealed density of at least 0.95 and an intrinsic viscosity of at least about 3, adsorbing said melted wax on the polymer particles and recovering a free-flowing particulate product that is essentially physically indistinguishable from the initially charged ethylene polymer; said petroleum wax being selected from the group consisting of a paraffin wax, an intermediate wax, and a microcrystalline wax; said paraffin wax having a melting point range of 120°–160° F., a molecular weight range of 340–400, a density range of 0.80–0.917, a gravity range of 35°–60° API at 210° F. and a 5% distillation point of 750°–810° F. (vacuum corrected to 760 mm Hg); said intermediate wax having a melting point range of 130°–160° F., a molecular weight range of 360–550, a density range of 0.85–0.93, a gravity range of 30°–55° API at 210° F. and a 5% distillation point of 825°–900° F. (vacuum corrected to 760 mm Hg); said microcrystalline wax having a melting point range of 130°–180° F., a molecular weight range of 500–600, a density range of 0.89–0.94, a gravity range of 30°–50° API at 210° F. and a 5% distillation point of 950°–1,050° F. (vacuum corrected to 760 mm Hg).

2. A process of claim 1 in which about 80 to 120 parts by weight of the petroleum wax are adsorbed on 100 parts by weight of the particle form ethylene polymer.

3. A process of claim 2 in which the petroleum wax is a paraffin wax.

4. A finely-divided, particulate, free flowing thermohardening ethylene polymer composition prepared by the method of claim 2.

5. A finely-divided, particulate, free flowing thermohardening ethylene polymer composition prepared by the method of claim 3.

6. A finely-divided, particulate, free flowing thermohardening ethylene polymer composition prepared by the method of claim 1.

7. A pressure free process for preparing castings of an ethylene polymer composition which consists essentially of filling a mold with a thermohardening ethylene polymer composition of claim 6, melting the ethylene polymer composition, and then cooling the mold to ambient temperature to solidify the ethylene polymer composition therein.

8. A process of claim 1 in which a preformed, intimate physical admixture of the particle form ethylene polymer and a finely-comminuted petroleum wax are subjected, at ambient temperature, to a mixing action of sufficient intensity so that the petroleum wax is melted and adsorbed on the ethylene polymer particles.

9. A transparent biaxially-oriented extruded film prepared by extruding an ethylene polymer composition consisting essentially of an intimate blend of 100 parts by weight of an ethylene polymer and about 20–150 parts by weight of a petroleum wax, said composition having an apparent viscosity of less than about 10,000 poises when extruded at an apparent shear rate of 400 sec.$^{-1}$ at 190° C; the ethylene polymer included in the composition having an annealed density of at least 0.95 and an intrinsic viscosity of at least about 3; said petroleum wax being selected from the group consisting of a paraffin wax, an intermediate wax, and a microcrystalline wax, said paraffin wax having a melting point range of 120°–160° F., a molecular weight range of 340–400, a density range of 0.80–0.917, a gravity range of 35°–60° API at 210° F. and a 5% distillation point of 750°–810° F. (vacuum corrected to 760 mm Hg); said intermediate wax having a melting point range of 130°–160° F., a molecular weight range of 360–550, a density range of 0.85–0.93, a gravity range of 30°–55° API at 210° F. and a 5% distillation point of 825°–900° F. (vacuum corrected to 760 mm Hg); said microcrystalline wax having a melting point range of 130°–180° F., a molecular weight range of 500–600, a density range of 0.89–0.94, a gravity range of 30°–50° API at 210° F. and a 5% distillation point of 950°–1,050° F. (vacuum corrected to 760 mm Hg).

10. A transparent biaxially-oriented extruded film of claim 9 in which the petroleum wax included therein is a paraffin wax.

11. A transparent biaxially-oriented extruded film of claim 10 in which the paraffin wax is present in the amount of 80 to 120 parts per weight per 100 parts by weight of the ethylene polymer.

12. A biaxially-oriented film of claim 9 in which the ethylene polymer composition contains a finely-divided inorganic filler in an amount constituting about 5 to 50 weight % of the total composition.

13. A biaxially-oriented film of claim 10 in which the ethylene polymer composition contains a finely-divided inorganic filler in an amount constituting about 5 to 50 weight percent of the total composition.

14. A biaxially-oriented film of claim 11 in which the ethylene polymer composition contains a finely-divided inorganic filler in an amount constituting about 5 to 50 weight percent of the total composition.

15. A transparent uniaxially-oriented extruded film prepared by extruding an ethylene polymer composition consisting essentially of an intimate blend of 100 parts by weight of an ethylene polymer and about 20–150 parts by weight of a petroleum wax, said composition having an apparent viscosity of less than about 10,000 poises when extruded at an apparent shear rate of 400 sec.$^{-1}$ at 190° C; the ethylene polymer included in the composition having an annealed density of at least 0.95 and an intrinsic viscosity of at least about 3; said petroleum wax being selected from the group consisting of a paraffin wax, an intermediate wax, and a microcrystalline wax; said paraffin wax having a melting point range of 120°–160° F., a molecular weight range of 340–400, a density range of 0.80–0.917, a gravity range of 35°–60° API at 210° F. and a 5% distillation point of 750°–810° F. (vacuum corrected to 760 mm Hg); said intermediate wax having a melting point range of 130°–160° F., a molecular weight range of 360–550, a density range of 0.85–0.93, a gravity range of 30°–55° API at 210° F. and a 5% distillation point of 825°–900° F. (vacuum corrected to 760 mm Hg); said microcrystalline wax having a melting point range of 130°–180° F., a molecular weight range of 500–600, a density range of 0.89–0.94, a gravity range of 30°–50° API at 210° F. and a 5% distillation point of 950°–1050° F. (vacuum corrected to 760 mm Hg).

* * * * *